(12) United States Patent
Nakayama et al.

(10) Patent No.: US 11,286,851 B2
(45) Date of Patent: Mar. 29, 2022

(54) GAS TURBINE ENGINE

(71) Applicant: KAWASAKI JUKOGYO KABUSHIKI KAISHA, Kobe (JP)

(72) Inventors: Satoshi Nakayama, Kobe (JP); Akihisa Oka, Kakogawa (JP); Hiroki Seike, Hiroshima (JP)

(73) Assignee: KAWASAKI JUKOGYO KABUSHIKI KAISHA, Hyogo (JP)

(*) Notice: Subject to any disclaimer, the term of this patent is extended or adjusted under 35 U.S.C. 154(b) by 116 days.

(21) Appl. No.: 16/441,786

(22) Filed: Jun. 14, 2019

(65) Prior Publication Data
US 2019/0292991 A1 Sep. 26, 2019

Related U.S. Application Data

(63) Continuation of application No. PCT/JP2017/044278, filed on Dec. 11, 2017.

(30) Foreign Application Priority Data

Dec. 16, 2016 (JP) .............................. JP2016-244695

(51) Int. Cl.
*F02C 6/08* (2006.01)
*F02C 9/18* (2006.01)
(Continued)

(52) U.S. Cl.
CPC .................. *F02C 6/08* (2013.01); *F02C 7/18* (2013.01); *F02C 7/24* (2013.01); *F02C 9/18* (2013.01);
(Continued)

(58) Field of Classification Search
CPC ...... F02C 9/18; F02C 6/08; F02C 7/18; F02C 7/185; F02C 7/28; F02C 7/228;
(Continued)

(56) References Cited

U.S. PATENT DOCUMENTS 6,775,990 B2    8/2004  Swinford
7,661,270 B2    2/2010  Morimoto et al.
(Continued)

FOREIGN PATENT DOCUMENTS

CN    104595036 A    5/2015
GB     2491048 A    11/2012
(Continued)

*Primary Examiner* — Gerald L Sung
*Assistant Examiner* — Rene D Ford
(74) *Attorney, Agent, or Firm* — Sughrue Mion, PLLC

(57) ABSTRACT

A gas turbine engine configured to combust, by means of a combustor, a compressed air obtained through compression by a compressor, and drive a turbine with use of high-temperature and high-pressure combustion gas generated by the combustion, the gas turbine engine including: a plurality of air passages through which different portions in the gas turbine engine communicate with one another; and a switching device configured to switch air flow paths between the plurality of air passages, wherein the plurality of air passages are each formed by an air pipe disposed outside a compressor casing, and the switching device is mounted to an outer surface of the compressor casing via a heat insulation member.

7 Claims, 4 Drawing Sheets

(51) Int. Cl.
*F02C 7/24* (2006.01)
*F02C 7/18* (2006.01)
*F02C 3/06* (2006.01)
*F02C 7/28* (2006.01)
*F01D 11/04* (2006.01)
*F02C 7/06* (2006.01)

(52) U.S. Cl.
CPC ............... *F01D 11/04* (2013.01); *F02C 3/06* (2013.01); *F02C 7/06* (2013.01); *F02C 7/28* (2013.01); *F05D 2240/55* (2013.01)

(58) Field of Classification Search
CPC ...... F02C 7/20; F02C 7/24; F02C 3/06; F02C 7/06; F02C 3/10; F02C 7/268; F02C 7/275; F01D 11/04; F01D 11/06; F01D 25/145; F01D 25/18; F01D 25/20; F05D 2240/55
See application file for complete search history.

(56) References Cited

U.S. PATENT DOCUMENTS

| | | |
|---|---|---|
| 9,932,900 B2 | 4/2018 | Sommerer et al. |
| 2004/0074237 A1* | 4/2004 | Swinford ............... F16K 1/221 60/772 |
| 2007/0107438 A1 | 5/2007 | Morimoto et al. |
| 2010/0050645 A1* | 3/2010 | Haggerty ............... F02C 7/222 60/739 |
| 2012/0156005 A1 | 6/2012 | Nielsen et al. |
| 2015/0082767 A1 | 3/2015 | Erickson et al. |
| 2015/0086338 A1 | 3/2015 | Aguilar |
| 2015/0139783 A1 | 5/2015 | Sommerer et al. |
| 2016/0201572 A1* | 7/2016 | Clauson ................... F02C 9/18 73/47 |
| 2016/0348587 A1 | 12/2016 | Banhos et al. |
| 2017/0107907 A1* | 4/2017 | Srinivas ................ F01D 25/24 |

FOREIGN PATENT DOCUMENTS

| | | |
|---|---|---|
| JP | 2004-138065 A | 5/2004 |
| JP | 2007-138809 A | 6/2007 |
| JP | 2017-078424 A | 4/2017 |

* cited by examiner

GAS TURBINE ENGINE

CROSS REFERENCE TO THE RELATED APPLICATION

This application is a continuation application, under 35 U.S.C. § 111(a), of international application No. PCT/JP2017/044278, filed Dec. 11, 2017, which claims priority to Japanese patent application No. 2016-244695, filed Dec. 16, 2016, the disclosure of which are incorporated by reference in their entirety into this application.

BACKGROUND OF THE INVENTION

Field of the Invention

The present invention relates to disposition of an air passage, of a gas turbine engine, used mainly for supplying seal air.

Description of Related Art

In one conventional configuration, an air pipe through which seal air for preventing oil leakage is supplied to a bearing portion of a gas turbine engine, is disposed outside an engine casing. The air pipe is provided with a switching valve which performs switching such that compressed air extracted from a compressor is supplied while the engine is in operation, and high-pressure air from an external auxiliary air supply is supplied while the engine is stopped (for example, Patent Document 1).

RELATED DOCUMENT

Patent Document

[Patent Document 1] JP Laid-open Patent Publication No. 2007-138809

SUMMARY OF THE INVENTION

However, the prior art does not mention any location at which the switching valve for compressed air is disposed. If the switching valve is disposed so as to be apart from a gas turbine engine body, equipment configuration such as piping for connection between the gas turbine engine body and the switching valve, and components associated with the piping, become large-scale, whereby a large space is required and the cost increases. On the other hand, if the switching valve is disposed so as to be close to the gas turbine engine body, the switching valve is adversely affected by heat from the gas turbine engine, resulting in malfunction or early degradation of the switching valve.

An object of the present invention is to provide a gas turbine engine in which a switching device for switching air passages has high reliability and which has a space-saving and compact arrangement configuration.

In order to attain the object, a gas turbine engine according to the present invention is a gas turbine engine configured to combust, by means of a combustor, a compressed air obtained through compression by a compressor, and drive, with use of high-temperature and high-pressure combustion gas generated by the combustion, a turbine coupled by a rotary shaft, the gas turbine engine including: a plurality of air passages through which different portions in the gas turbine engine communicate with one another; and a switching device configured to switch air flow paths among the plurality of air passages, in which the plurality of air passages are each formed by an air pipe disposed outside an engine casing, and the switching device is mounted to an outer surface of the engine casing via a heat insulation member.

In this configuration, since the air pipes that form the plurality of air passages and the switching device are arranged outside the engine casing, a space for the arrangement has a margin, whereby it becomes easy to make such arrangement that an adverse effect of heat due to high temperature in the engine casing is unlikely to occur. In addition, owing to a heat insulation effect of the heat insulation member, the temperature of the switching device is further effectively prevented from increasing. Therefore, no malfunction or no degradation of the switching device due to increase in the temperature thereof occurs, and the reliability of the switching device is ensured at a high level.

In the gas turbine engine according to the present invention, the switching device may be mounted via a stay so as to be apart from the surface of the engine casing. In this case, a greater effect of suppressing increase in the temperature can be expected owing to the separation, of the switching device, that is attained by the presence of the stay.

In the gas turbine engine according to the present invention, the switching device may be secured to a support member for another accessory device. In this case, space saving and cost reduction can be achieved through sharing of the common support member.

In the gas turbine engine according to the present invention, the another accessory device may be a fuel manifold. In this case, since the fuel manifold and the switching device are located close to each other, increase in the temperature of the switching device is suppressed by low-temperature fuel flowing in the fuel manifold.

In the gas turbine engine according to the present invention, the switching device may be mounted to an outer surface of a compressor casing. In this case, since the compressor casing is apart from the turbine and the combustor of which the temperatures are increased to high temperatures, the switching device is not greatly influenced by heat from the turbine and the combustor. Accordingly, the switching device is prevented from overheating.

In the gas turbine engine according to the present invention, the switching device may be an automatic switching valve including: a valve body configured to open or close one of the air passages; and an actuator configured to open or close the valve body on the basis of an air pressure of the one air passage. In this case, particularly the actuator of the automatic switching valve can be prevented from being adversely affected by heat. Furthermore, the switching device can be configured, as the simple automatic switching valve, from the valve body and the actuator.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
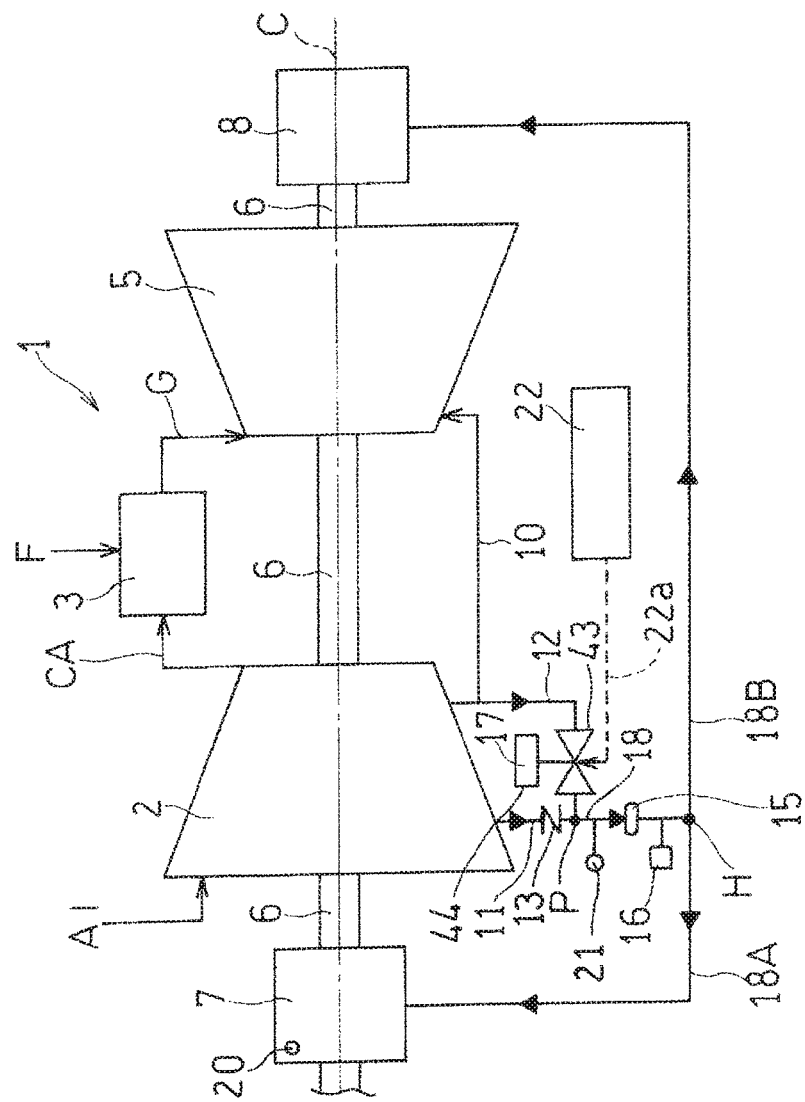
FIG. 1 is a schematic configuration diagram of a gas turbine engine according to an embodiment of the present invention.

Hereinafter, a gas turbine engine (hereinafter, can be referred to simply as a gas turbine) according to one embodiment of the present invention will be described with reference to the drawings. FIG. 1 is a schematic configuration diagram showing the gas turbine engine according to the embodiment of the present invention. In FIG. 1, in a gas turbine 1, an air A1 introduced from the outside is compressed into compressed air CA by a compressor 2, the compressed air CA is guided to a combustor 3 and mixed with fuel F injected into the combustor 3 such that the resultant mixture is combusted, and a turbine 5 is driven by high-temperature and high-pressure combustion gas G obtained by the combustion. In the following description, the compressor 2 side in an axial direction C of the gas turbine 1 is sometimes referred to as "front side", and the turbine 5 side in the axial direction C of the gas turbine 1 is sometimes referred to as "rear side".

The compressor 2 and the turbine 5 are coupled with each other by a rotary shaft 6, and the turbine 5 drives the compressor 2. A front portion of the rotary shaft 6 is supported by a bearing accommodated in a bearing chamber 7, and a rear portion of the rotary shaft 6 is supported by a bearing accommodated in a bearing chamber 8. The type of the rotary shaft 6 may be a single shaft type in which the rotary shaft 6 is divided into a plurality (for example, two or three) of portions in the axial direction, or may be a single shaft type in which the rotary shaft 6 is not divided but has a one-piece configuration. The present invention is applicable also to a gas turbine having rotary shafts of a so-called multi-shaft type, in which the compressor 2 divided into a plurality of portions in the axial direction and the turbine 5 divided into a plurality of portions in the axial direction, are coupled by the multiple rotary shafts which are concentric with each other.

The turbine 5 and a high-pressure stage side (for example, a tenth stage) of the compressor 2 in FIG. 1 are connected to each other through a cooling air supply passage 10, and a part of the compressed air CA extracted from the high-pressure stage side of the compressor 2 is supplied as air for internal cooling to each place in the turbine 5.

The compressor 2 includes, as a plurality of air passages through which different portions in the gas turbine engine 1 communicate with one another, a low-pressure air supply passage 11 through which the compressed air CA for sealing is supplied from a low-pressure stage side (for example, a fourth stage) of the compressor 2 to the bearing chambers 7 and 8, and a high-pressure air supply passage 12 through which the compressed air CA for sealing is supplied from the high-pressure stage side of the compressor 2 to the bearing chambers 7 and 8. The high-pressure air supply passage 12 is provided so as to branch from the cooling air supply passage 10. The high-pressure air supply passage 12 merges with the low-pressure air supply passage 11 at a merging point P, and a check valve 13 is disposed at an upstream side, of the merging point P, in the low-pressure air supply passage 11. A downstream side of the merging point P serves as an air supply passage 18, and, in the air supply passage 18, a filter 15 for removing foreign matters in air and a drain ejector 16 are disposed.

On the high-pressure air supply passage 12 at the upstream side of the merging point P, a switching device 17 capable of switching, as appropriate, between the low-pressure air supply passage 11 and the high-pressure air supply passage 12 is disposed. The air supply passage 18 branches, at an intermediate portion thereof, into a front-side air supply passage 18A and a rear-side air supply passage 18B. The front-side air supply passage 18A is connected to the bearing chamber 7 on the front side, and the rear-side air supply passage 18B is connected to the bearing chamber 8 on the rear side. The switching device 17 is formed as an automatic switching valve. The automatic switching valve 17 includes a valve body 43 disposed in the high-pressure air supply passage 12, and an actuator 44 for driving the valve body 43. The actuator 44 is of, for example, an electric type, and selectively introduces valve-driving air by means of a solenoid valve and moves a valve-driving rod 44a with the air pressure of the valve-driving air, thereby opening or closing the valve body 43.

The rotation speed of the gas turbine 1 is detected by a rotation speed sensor 20 mounted to the bearing chamber 7. The pressure of the compressed air CA for sealing is detected by a pressure sensor 21 provided to the air supply passage 18. The rotation speed sensor 20 may be disposed at a portion other than the bearing chamber 7 as long as the rotation speed of the gas turbine 1 can be detected at the portion.

The gas turbine 1 is provided with a controller 22 capable of appropriate drive control. To the controller 22, the rotation speed of the engine detected by the rotation speed sensor 20 and the pressure detected by the pressure sensor 21 are inputted as pieces of monitoring information. The controller 22 operates the switching device 17 on the basis of the result of calculation processing of those pieces of information so that control for switching to either appropriate one of the low-pressure air supply passage 11 and the high-pressure air supply passage 12 can be performed as appropriate.

Figure 2:
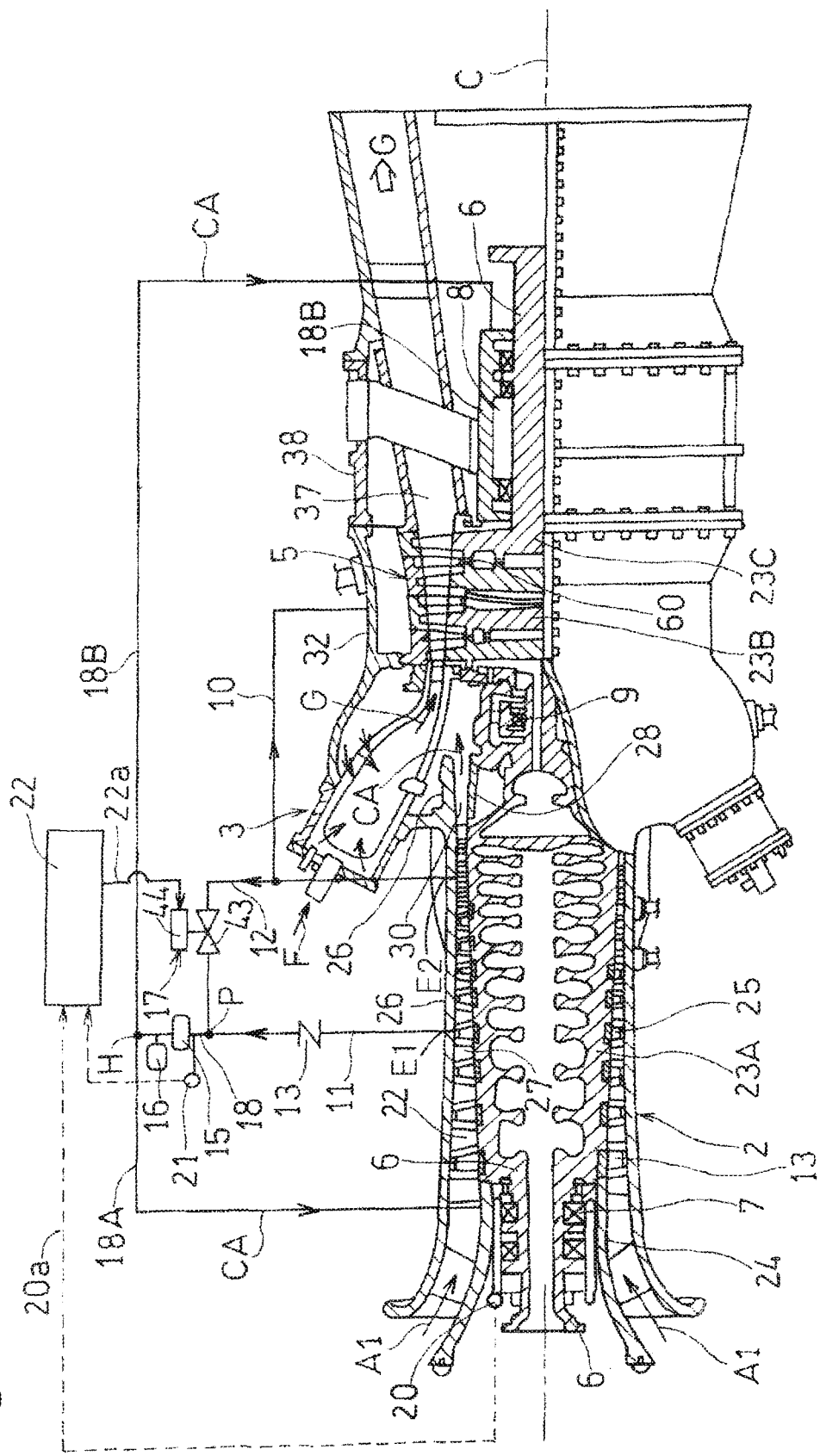
FIG. 2 is a partially-cut-away side view of the gas turbine engine.

FIG. 2 is a partially-cut-away side view showing the gas turbine engine 1. The gas turbine engine 1 shown in FIG. 1 will be more specifically described with reference to FIG. 2. As shown in FIG. 2, the gas turbine engine 1 uses an axial-flow compressor as the compressor 2. In the axial-flow compressor 2, a large number of rotor blades 25 are arranged on the outer circumferential surface of a compressor rotor 23A which constitutes a front portion of a rotating part of the gas turbine 1. With the combination of these rotor blades 25 and a large number of stator blades 27 arranged on the inner circumferential surface of a compressor casing (which is a part of an engine casing) 26, the air A1 taken in from an opening in the front portion is compressed. The compressed air CA is supplied toward the combustor 3 via a diffuser 30 disposed at a downstream side of the compressor 2.

A plurality (for example, eight) of the combustors 3 are arranged at equal intervals along the circumferential direction of the gas turbine 1. In each combustor 3, the compressed air CA supplied from the compressor 2 is mixed with the fuel F injected into the combustor 3 such that the mixture is combusted, and the high-temperature and high-pressure combustion gas G thus generated by the combustion flows into the turbine 5.

The turbine 5 includes: turbine rotors 23B and 23C which constitute a central portion and a rear portion in the axial direction of the rotating portion of the gas turbine 1, respectively; and a turbine casing (which is a part of the engine casing) 32 covering those rotors 23B and 23C. The turbine rotor 23B is coupled to the compressor rotor 23A so as to rotate together therewith. An air discharge passage casing (a part of the engine casing) 38 forming an air discharge passage 37 is coupled to a rear portion of the turbine casing 32.

The rotors 23A and 23B form a front portion of the rotary shaft 6, and are rotatably supported via the bearing chamber 7 and a bearing chamber 9 at the front side and the central side by the compressor casing 26 and the turbine casing 32. The rotor 23C forms a rear portion of the rotary shaft 6 at the rear side, and is rotatably supported via the bearing chamber 8 at the rear side by the air discharge passage casing 38. The front portion and the rear portion of both rotary shafts 6 are coupled by a gear coupling 60 so as to rotate together with each other.

In the gas turbine 1 having such a configuration, the low-pressure air supply passage 11 (FIG. 2) which is one of the plurality of air passages described in the aforementioned FIG. 1, is formed by providing a first air-extraction port E1 at a portion of the compressor casing 26, that corresponds to the low-pressure stage side of the compressor 2, and connecting, to the first air-extraction port E1, an air pipe that forms the low-pressure air supply passage 11. On the other hand, the high-pressure air supply passage 12 which is one of the air passages, is formed by providing a second air-extraction port E2 at a portion of the compressor casing 26 constituting a front portion of the engine casing, that corresponds to the high-pressure stage side of the compressor 2, and connecting, to the second air-extraction port E2, an air pipe that forms the cooling air supply passage 10. Both the air pipe that forms the low-pressure air supply passage 11 and an air pipe that forms the high-pressure air supply passage 12, are disposed outside the compressor casing 26.

When the automatic switching valve serving as the switching device 17 for switching air flow paths between the low-pressure air supply passage 11 and the high-pressure air supply passage 12 is closed, the high-pressure air supply passage 12 is closed, and the compressed air CA from the low-pressure air supply passage 11 which is constantly open is supplied through the air supply passage 18 to the bearing chambers 7 and 8. On the other hand, when the automatic switching valve serving as the switching device 17 is opened, the high-pressure air supply passage 12 is opened, the compressed air CA therefrom blocks the low-pressure air supply passage 11, and the compressed air CA from the high-pressure air supply passage 12 is supplied through the air supply passage 18 to the bearing chambers 7 and 8. A rotation speed signal 20a detected by the rotation speed sensor 20 and information detected by the pressure sensor 21 are inputted to the controller 22 which determines, from the result of the calculation processing of the inputted signal and information, whether supply of the compressed air CA to the bearing chambers 7 and 8 is to be performed through the low-pressure air supply passage 11 or the high-pressure air supply passage 12. The actuator 44 of the switching device 17 is operated in response to a command 22a, from the controller 22, that is based on the result of the determination, so as to switch between opening and closing.

Regardless of which of the low-pressure air supply passage 11 and the high-pressure air supply passage 12 is selected, the selected one communicates with the air supply passage 18, and the compressed air CA is supplied between walls enclosing the bearing chambers 7 and 8 and the outer circumferential surface of the rotary shaft 6, whereby an area therebetween is air-sealed for preventing oil leakage from the bearing chambers 7 and 8. For the bearing chamber 9 at the central side, air-sealing is performed by a separate system.

Figure 3:
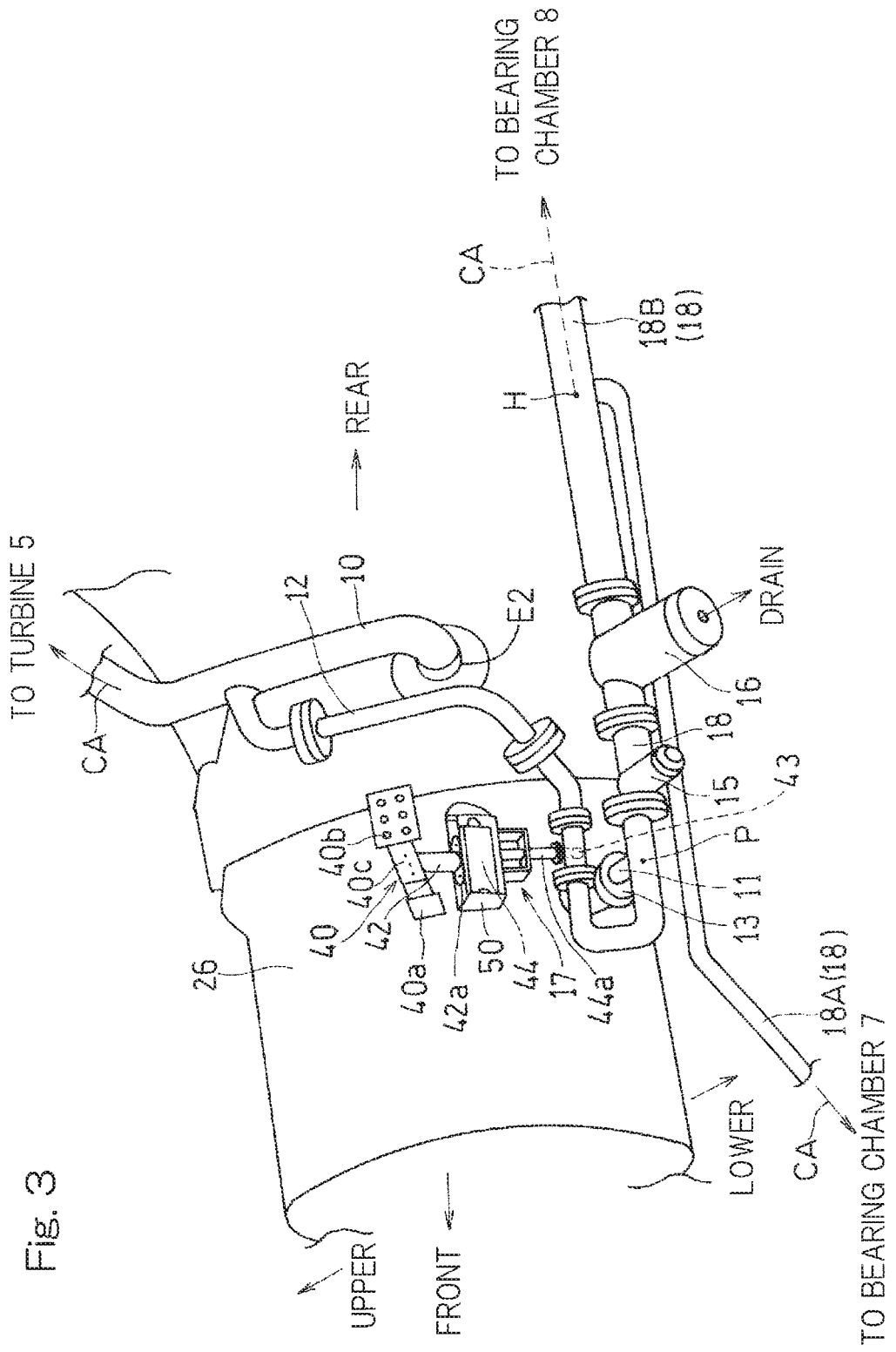
FIG. 3 is a perspective view as seen from the lower surface side of a compressor casing mounted with a switching device.

Next, a specific configuration of the switching device 17 will be described with reference to FIG. 3. FIG. 3 is a perspective view as seen from the lower surface side of the compressor casing 26 mounted with the switching device 17. In FIG. 3, the switching device 17 is mounted to the outer surface of a lower half portion of the compressor casing 26. The air pipe that forms the cooling air supply passage 10 is connected to the second air-extraction port E1 disposed at the high-pressure stage side (for example, the tenth stage) in the compressor casing 26 so that cooling air is supplied to the turbine 5 (FIG. 1). The air pipe that forms the high-pressure air supply passage 12 is provided so as to branch from the cooling air supply passage 10.

A mounting seat 40b of a support member 40 for supporting a fuel manifold 53 (FIG. 5) which is another accessory device, is fixed to the outer surface of a lower portion of the compressor casing 26. The fuel manifold 53 is fixed to the mounting seat 40b of the support member 40. The switching device 17 is secured to the support member 40 via a stay 42.

The support member 40 includes: a mounting seat 40a, at the lower side, which is mounted to the compressor casing 26; the manifold mounting seat 40b, at the upper side, which is T-shaped; and a pillar portion 40c coupling those mounting seats 40a and 40b with each other. The stay 42 is fixed to the pillar portion 40c by means of fastening members 46 (FIG. 4) such as a bolt and a nut, and a heat insulation member 50 in the form of a heat insulation cover is mounted to the stay 42 by means of fastening members 47 (FIG. 4) such as bolts, in a state of being apart from the compressor casing 26, that is, in a state where a space S (FIG. 5) is formed between the heat insulation member 50 and the compressor casing 26. Accordingly, also the entirety of the switching device 17 is apart from the compressor casing 26.

Figure 4:
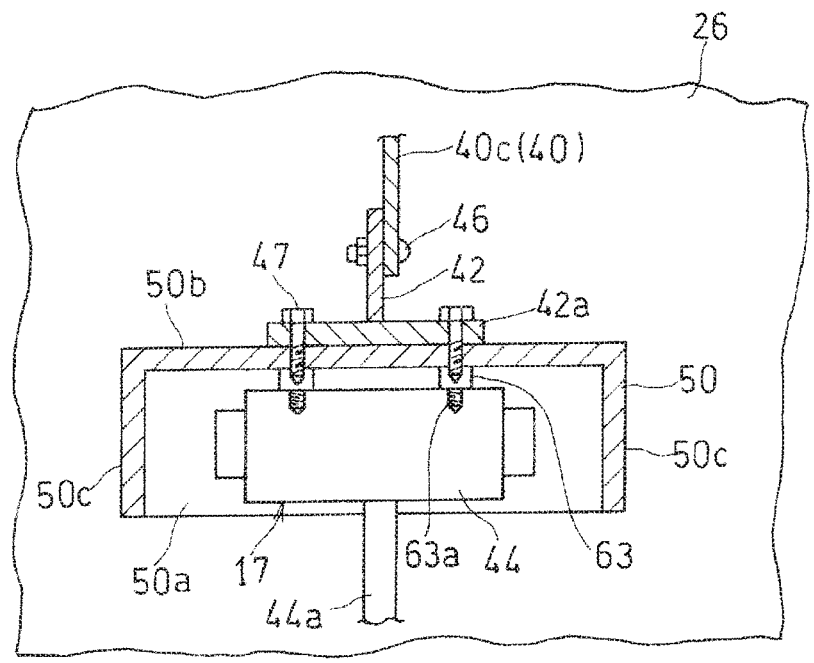
FIG. 4 is a cross-sectional view indicating, in a simplified manner, a mounting relationship between a support member and the switching device.

As shown in FIG. 4, the heat insulation member 50 includes: a back wall 50a covering a portion, of the actuator 44, that is close to the compressor casing 26; an upper wall 50b covering a portion, of the actuator 44, that is close to the stay 42; and two end walls 50c and 50c covering the front and rear surface sides of the actuator 44, respectively. The valve-driving rod 44a of the actuator 44 extends beyond a lower portion, of the heat insulation member 50, which is the opposite side of the upper wall 50b, and thus the lower portion is open with no wall provided. A portion, of the heat insulation member 50, that is on the side opposite to the compressor casing 26 side, is also open with no wall provided. A plurality of spacers 63 are attached to the actuator 44 of the switching device 17 by screwing, into the actuator 44, thread bodies 63a formed on the spacers 63. The fastening members 47 are screwed into the spacers 63 so as to penetrate a mounting seat 42a of the stay 42 and the upper wall 50b of the heat insulation member 50. Accordingly, the heat insulation member 50 and the switching device 17 are secured to the stay 42 by means of the fastening members 47 with the spacers 63 being interposed between the heat insulation member 50 and the switching device 17. The heat insulation member 50 and the spacers 63 are made of, for example, stainless steel.

A portion of the compressed air CA entering the air supply passage 18 from the low-pressure air supply passage 11 or the high-pressure air supply passage 12 of the compressor 2 shown in FIG. 2 is supplied through the rear-side air supply passage 18B to the bearing chamber 8 on the rear side, and the other portion of the compressed air CA branches at a branching point H and is supplied through the front-side air supply passage 18A to the bearing chamber 7 on the front side.

A control operation for the gas turbine engine 1 configured as described above will be described. First, when the gas turbine engine 1 in FIG. 2 is started, the controller 22 causes the switching device 17 to open the valve so as to supply the compressed air CA from the high-pressure stage side of the compressor 2 through the high-pressure air supply passage 12 and the air supply passage 18 to the bearing chambers 7 and 8. At this time, in the low-pressure air supply passage 11, the check valve 13 prevents backflow of the compressed air CA into the low-pressure air supply passage 11.

When the rotation speed reaches a predetermined value from the time of the starting, the controller 22 determines, on the basis of the rotation speed signal 20a from the rotation speed sensor 20, that a transition to a steady operation has been attained, and causes the switching device 17 to close the valve, so as to stop the usage of the compressed air CA from the high-pressure air supply passage 12 and supply the compressed air CA through the low-pressure air supply passage 11 and the air supply passage 18 to the bearing chambers 7 and 8.

In a condition in which the gas turbine engine 1 is being reduced in speed toward a stopped state, when the rotation speed becomes lower than the predetermined value, the controller 22 causes the switching device 17 to open the valve so as to supply the compressed air CA from the high-pressure air supply passage 12 to the bearing chambers 7 and 8. In a condition in which the gas turbine engine 1 is stopped, since oil leakage from the bearing chambers 7 and 8 is unlikely to occur, air-sealing is not required, and thus the compressed air CA is not supplied to the bearing chambers 7 and 8.

In the gas turbine engine 1 configured as described above, since the air pipes that form the plurality of air passages 11 and 12 and the switching device 17 in FIG. 2 are arranged outside the compressor casing 26, a space for the arrangement has a margin, whereby it becomes easy to make such arrangement that an effect of heat due to high temperature in the compressor casing 26 is unlikely to occur. In addition, owing to a heat insulation effect of the heat insulation member 50, the temperature of the switching device 17 is further effectively prevented from increasing. Therefore, no malfunction or no degradation of the switching device 17 due to increase in the temperature thereof occurs, and the reliability of the switching device 17 is ensured at a high level.

Figure 5:
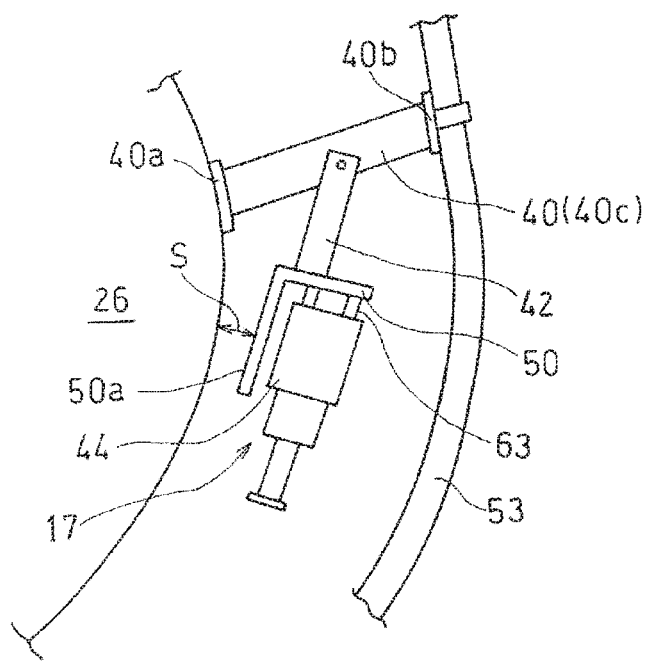
FIG. 5 is a front view indicating, in a simplified manner, a state where the switching device is mounted to the support member which supports a fuel manifold.

As shown in FIG. 5, the switching device 17 is mounted via the stay 42 so as to be apart from the surface of the compressor casing 26. Accordingly, a greater heat insulation effect can be expected owing to separation, of the switching device 17, that is attained by the presence of the stay 42. In addition, since the back wall 50a of the heat insulation member 50 covering the switching device 17 is apart from the outer surface of the compressor casing 26 by the space S, increase in the temperature of the heat insulation member 50 itself can also be suppressed, whereby the effect, of the heat insulation member 50, of suppressing increase in the temperature of the switching device 17 is further enhanced.

Since the switching device 17 is mounted to the support member 40 for supporting the fuel manifold 53 which is the other accessory device, space saving and cost reduction can be achieved through sharing of the common support member 40. Since the fuel manifold 53 and the switching device 17 are located close to each other, increase in the temperature of the switching device 17 is suppressed by low-temperature fuel flowing in the fuel manifold 53.

As shown in FIG. 3, the switching device 17 is mounted to the compressor casing 26, and the compressor casing 26 is apart from a high-temperature portion including the combustors 3 and the turbine 5 shown in FIG. 2, whereby the switching device 17 is not influenced by the heat from these combustors 3 and the turbine 5. Accordingly, the switching device 17 is prevented from overheating.

As shown in FIG. 2, the switching device 17 is an automatic switching valve 17 including: the valve body 43 for opening or closing the high-pressure air supply passage 12; and the actuator 44 for opening or closing the valve body 43 on the basis of the air pressure of the high-pressure air supply passage 12. Accordingly, particularly the actuator 44 of the automatic switching valve 17 can be prevented from being adversely affected by heat. Furthermore, the switching device 17 can be configured, as the simple automatic switching valve 17, from the valve body 43 and the actuator 44.

Although the present invention has been fully described in connection with the preferred embodiments thereof with reference to the accompanying drawings, numerous additions, changes, or deletions can be made without departing from the gist of the present invention. For example, the switching device 17 and the heat insulation member 50 therefor may be mounted to the outer surface of the turbine casing 32 or the air discharge passage casing 38 which, together with the compressor casing 26, constitutes the engine casing. In addition, the air passages to be subjected to the switching are not limited to air passages for air-sealing the bearing chambers 7 to 9, but may be, for example, air passages for supplying cooling air therethrough to the turbine. Therefore, these are also construed as included within the scope of the present invention.

REFERENCE NUMERALS

1 . . . Gas turbine
2 . . . Compressor
3 . . . Combustor
5 . . . Turbine
6 . . . Rotary shaft
7, 8, 9 . . . Bearing chamber
10 . . . Cooling air supply passage
11 . . . Low-pressure air supply passage (Air passage)
12 . . . High-pressure air supply passage (Air passage)
17 . . . Switching device
18 . . . Air supply passage
18A . . . Front-side air supply passage
18B . . . Rear-side air supply passage
20 . . . Rotation speed sensor
21 . . . Pressure sensor
22 . . . Controller
26 . . . Compressor casing (Engine casing)
32 . . . Turbine casing (Engine casing)
38 . . . Air discharge passage casing (Engine casing)

40 ... Support member
42 ... Stay
43 ... Valve body
44 ... Actuator
50 ... Heat insulation member
53 ... Fuel manifold (accessory device)
CA ... Compressed air
G ... High-temperature and high-pressure combustion gas

What is claimed is:

1. A gas turbine engine configured to combust, by means of a combustor, a compressed air obtained through compression by a compressor, to drive, with use of high-temperature and high-pressure combustion gas generated by the combustion, a turbine coupled by a rotary shaft, the gas turbine engine comprising:
   a plurality of air passages through which different portions in the gas turbine engine communicate with one another; and
   a switching device configured to switch air flow paths among the plurality of air passages,
   wherein the plurality of air passages are each formed by an air pipe disposed outside an engine casing, and the switching device is mounted to an outer surface of the engine casing via a heat insulation member, and
   the heat insulation member includes a portion on a side of the engine casing that is provided with a wall covering a portion of the switching device on the side of the engine casing, and another portion on a side opposite to the engine casing that is open with no wall provided.

2. The gas turbine engine as claimed in claim 1, wherein the switching device is mounted to the outer surface of the engine casing via a stay so as to be apart from the outer surface of the engine casing.

3. The gas turbine engine as claimed in claim 1, wherein the switching device is secured to a support member that supports another accessory device.

4. The gas turbine engine as claimed in claim 3, wherein the another accessory device is a fuel manifold.

5. The gas turbine engine as claimed in claim 1, wherein the switching device is mounted to an outer surface of a compressor casing which is a portion of the engine casing.

6. The gas turbine engine as claimed in claim 1, wherein the switching device is an automatic switching valve including: a valve body configured to open and close one of the air passages of the plurality of air passages; and an actuator configured to open or close the valve body on the basis of an air pressure in the one air passage.

7. The gas turbine engine as claimed in claim 1, wherein the switching device is mounted to a bottom half of the outside of the engine casing.

* * * * *